(12) United States Patent
Hentilä et al.

(10) Patent No.: US 6,219,551 B1
(45) Date of Patent: Apr. 17, 2001

(54) METHOD FOR LOCATING A CALLED SUBSCRIBER

(75) Inventors: Marko Hentilä, Stockholm (SE); Hannu Peltola; Timo Varsila, both of Espoo (FI)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 08/981,518

(22) PCT Filed: Jun. 27, 1996

(86) PCT No.: PCT/FI96/00378

§ 371 Date: Apr. 22, 1998

§ 102(e) Date: Apr. 22, 1998

(87) PCT Pub. No.: WO97/01918

PCT Pub. Date: Jan. 16, 1997

(30) Foreign Application Priority Data

Jun. 28, 1995 (FI) .......................................... 953209

(51) Int. Cl.⁷ ...................................................... H04Q 7/20
(52) U.S. Cl. .................... 455/445; 340/825.44; 379/211; 455/31.2
(58) Field of Search ..................................... 379/201, 207, 379/211, 219, 220, 170; 455/31.2, 31.3, 458, 459, 425, 426, 445; 370/94.1; 179/18 B; 340/825.44, 825.47

(56) References Cited

U.S. PATENT DOCUMENTS

| | | | |
|---|---|---|---|
| 4,065,642 | * 12/1977 | McClure | 179/18 B |
| 4,313,035 | 1/1982 | Jordan et al. | 179/18 |
| 5,179,721 | * 1/1993 | Comroe et al. | 455/33.1 |
| 5,206,901 | * 4/1993 | Harlow et al. | 379/211 |
| 5,278,890 | * 1/1994 | Beeson, Jr. et al. | 370/94.1 |
| 5,506,837 | * 4/1996 | Sollner et al. | 370/31 |
| 5,533,094 | * 7/1996 | Sanmugam | 455/33.1 |
| 5,541,976 | * 7/1996 | Ghisler | 379/57 |
| 5,592,541 | * 1/1997 | Fleischer, III et al. | 379/211 |
| 5,602,903 | * 2/1997 | LeBlanc et al. | 342/450 |

FOREIGN PATENT DOCUMENTS

| | | |
|---|---|---|
| 549126 | 6/1993 | (EP) . |
| 588646 | 3/1994 | (EP) . |
| 2274758 | 8/1994 | (GB) . |
| WO95/12268 | 5/1995 | (WO) . |

\* cited by examiner

*Primary Examiner*—Ahmad Matar
*Assistant Examiner*—Bing Bui
(74) *Attorney, Agent, or Firm*—Burns, Doane, Swecker & Mathis, L.L.P.

(57) ABSTRACT

A service of an intelligent network consists of two alternative modes of operation. In a first node of operation, that is, parallel paging, the service does not know at which number the called subscriber can be reached. A paging message is thus transmitted substantially simultaneously to all the numbers determined for the subscriber regardless of which network the number is associated with. The call will be connected to the number at which the call is first answered. In the second mode of operation, that, precision paging, the service knows at which number of the plurality of numbers stored in the database the called subscriber can be reached. The paging message is thus transmitted and the call is thus connected to this number only. It is thus possible to reach a subscriber at a number of a PLMN, DECT or fixed network.

15 Claims, 3 Drawing Sheets

METHOD FOR LOCATING A CALLED SUBSCRIBER

Figure 1:
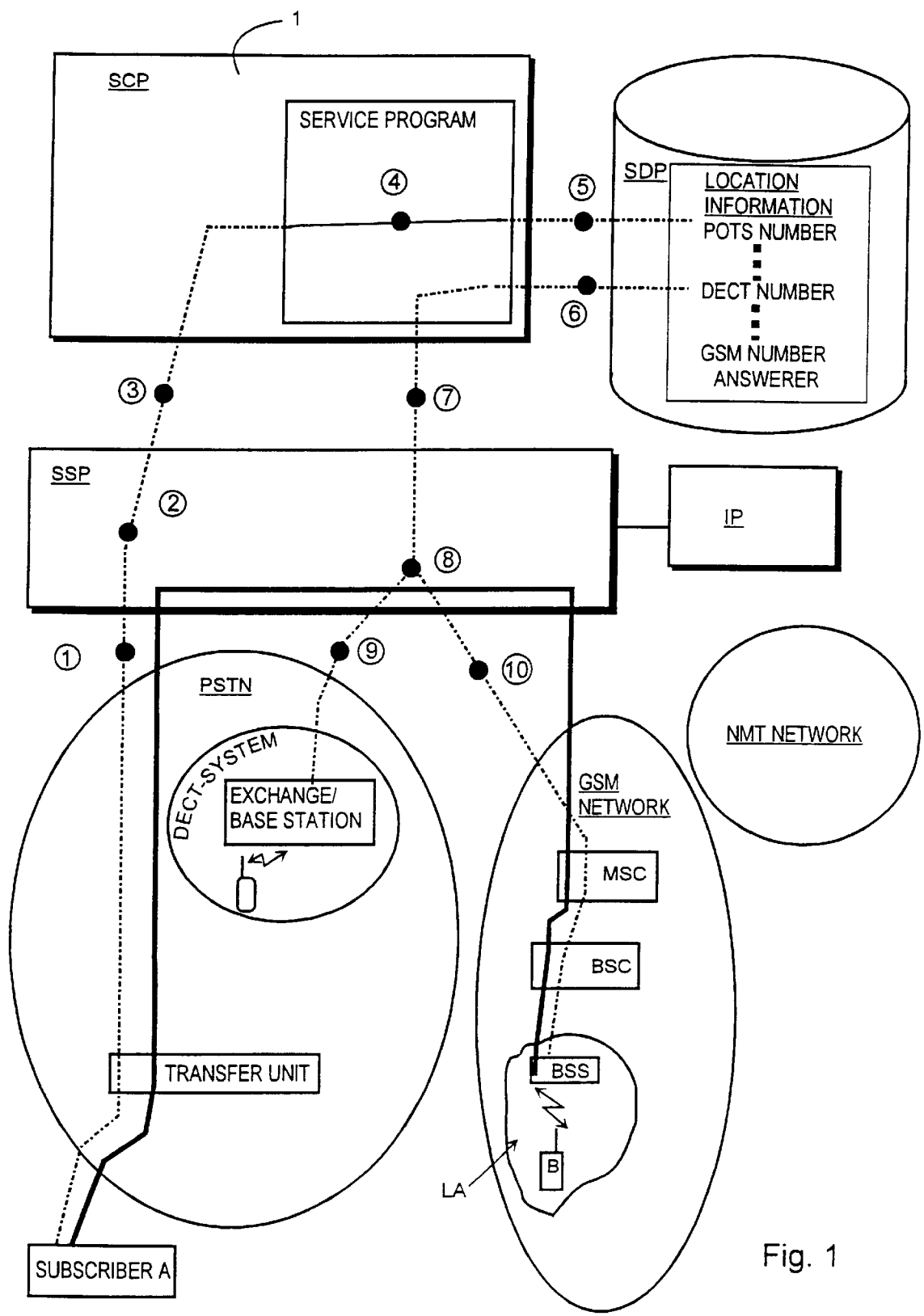

The invention relates to an intelligent network service for transmitting a call request and establishing a connection to a subscriber for which a plurality of terminal equipment numbers have been determined.

Rapid development of telecommunication has enabled the teleoperators to provide the users with a large variety of different services. Network architecture providing developed services is termed as intelligent network IN. The intelligent network architecture may be applied to most telecommunication networks, such as public switched telephone networks PSTN, mobile and packet switched public data networks PSPDN, as well as to ISDN and B-ISDN networks (integrated services digital network, broadband-ISDN). Regardless of the network technology, the aim of the intelligent network architecture is to facilitate development, control and management of new teleservices. ITU-T (International Telecommunication Union— Telecommunication Standardisation Sector) has specified the intelligent network in generally known Q.1200-series recommendations.

A service switching point SSP contains call management and service selecting functions. It is able to detect the service requests of the intelligent network. A service control point SCP contains the service programs that are used for producing the services provided by the intelligent network. A service data point SDP is a database that contains subscriber- and network-specific data used by the service programs of the SCP for producing individual services. An intelligent peripheral IP provides special functions, such as announcements, as well as voice and multiple-choice recognition.

A Basic Call State Model BCSM defined in association with the intelligent network describes different stages of call processing and identifies the points where call processing may be interrupted for activating an IN service. It detects those points (detection point) in a call and connection process at which the IN service logic entities may interact with basic call and connection management features.

The intelligent network architecture may be applied to almost all networks, whereby the commonest use is establishing a speech connection between two or more subscribers. It is a general principle that call establishment takes place under control of the intelligent network, whereby signalling takes place both in the intelligent network and in the network/networks connected to it via the SSP, and between the networks, whereas the actual speech connection is switched as usual directly from a terminal equipment to another in said network/networks via a service switching function SSF related to one or more services. The subscriber may be e.g. a subscriber of the GSM, NMT or fixed network, or an extension of an exchange. The extension may also be a cordless extension, in which case the subscriber may be connected to the exchange by means of a telephone operating in accordance with the CT2 or DECT specification. In cordless exchanges (wireless-PBX, cordless-PBX), part of the subscriber lines are replaced with a radio connection. Cordless exchanges have both fixed and cordless extensions. Cordless exchanges provide the users of cordless telephones with a mobility option, which is determined by the coverage area of the cordless base stations. The coverage area is typically limited to the inside of an office building.

The DECT system may generally be regarded as a PCS system (Personal Communication System), in which one and the same cordless telephone may be used for establishing calls both at home and in the office provided that the user has first registered to the exchange of his current location area. By combining a DECT telephone and a GSM telephone and later e.g. a DCS telephone into one terminal equipment, that is, a so-called multimode telephone, the user may use the DECT mode of the telephone at home and in the office, and thus make use of usually more economical call tariffs. When the mode of the telephone is switched manually, or the mode is automatically switched into the GSM mode, the user may utilize a high degree of mobility offered by the GSM system.

A prior art service provided by the intelligent network is a Follow-Me-Destination FMD, in which the subscriber of the service is given a number, and the incoming calls to this number are directed to the subscriber number registered by the subscriber in each case. Said subscriber number may be e.g. a subscriber number of a fixed network or a mobile subscriber number. The subscriber of the service may change this number any time or from any telephone. Another prior art service is a personal number UPT (Universal Personal Telecommunications), by means of which the user has an access to telephone services from any telephone connected to the public switched telephone network. Billing is always directed to charge the subscriber's bank account. Besides the standard outgoing call, the UPT service also provides location updating, by means of which the subscriber may direct the incoming calls to the physical telephone number determined by the subscriber. The user of the service first dials a service number, by means of which he activates the service. Thereafter, he gives his personal UPT number and a personal identification number PIN. Thereafter he may select an originating call, location updating or exit from the service. Another prior art service is Call Redirection, in which a call is routed to a new destination in case there is no answer, or the line is busy. Yet another prior art service is a Personal Number. In accordance with this service, a user who may have a plurality of terminal stations is provided with a personal subscriber number that consists of a prefix, which, in turn, nowadays usually directs the call to the intelligent network, and of an individual subscriber number. All the calls addressed to the personal number are routed to the service of the intelligent network, which retrieves from the database the numbers of the terminal equipments corresponding to the personal number. The call is directed from one terminal equipment to another in turn, and a speech connection is established to the equipment that answers the call request.

The above services provided by the intelligent network are attended by a few drawbacks. In Follow Me and Call Redirection services, the subscriber himself must inform the intelligent network of his current location, or otherwise the incoming call is routed to the number last registered by the subscriber. This number may be e.g. a fixed subscriber number, although the subscriber is currently located in the mobile network. In the Universal Personal Telecommunications service, the subscriber must also communicate his location, i.e. the subscriber number at which he can be reached, to the intelligent network. The problem of the Personal Number PN service is the fact that calling the physical subscriptions one after another requires plenty of time, particularly if the subscriber answers at the last number of the list of numbers. Therefore, this service is often supplied with a voice announcement informing the calling subscriber of the possible slowness of the call establishment. Besides, repeated signalling between the intelligent network and the destination network is required for each call attempt.

The object of the present invention is a method having none of the drawbacks disclosed above. The object is to establish a speech connection firstly with a minimum delay after the call request when the location of the called subscriber is unknown, and secondly, practically with no delay when the present location of the subscriber is known. The method must be practicable regardless of the fact whether the call is to be transmitted to a subscriber terminal or a DECT telephone connected to the fixed telephone network, or to a subscriber terminal connected to a mobile network, such as the GSM network. An object is particularly a method that is suited for use in connection with a multimode telephone, which is operable both in the GSM and in the DECT system.

The above objects are achieved with a method as claimed in claim 1 of this application.

The database SDF of the service control point SCP of the intelligent network contains a group of terminal station subscriber numbers stored for each subscriber. The numbers may include a number of the plain old telephone service (POTS) and a number of the DECT telephone, as well as a PLMN number, such as a GSM, DCS or NMT number. The call of the calling subscriber is routed via the service switching point to the service control point of the intelligent network when certain trigger criteria are fulfilled. At the service control point, a service in accordance with the invention is activated, which service consists of two modes of operation.

In a first mode of operation, the intelligent network does not know at which subscriber number the called party can be reached. The call message will thus be substantially simultaneously transmitted to the desired numbers regardless of which network the number is associated with. The call message may thus be transmitted substantially simultaneously from an exchange connected to the service switching point both to the mobile services switching centre, which will further transmit a paging message along the radio path in the location area of the subscriber, and to the exchange of the fixed network or to a PBX network, which will further call a DECT telephone connected thereto. The calling subscriber will be connected to the number at which the call is first answered, and the other signalling connections will be released. Call charging will be activated. Call charging may take place with the assistance of the intelligent network, or it may be carried out entirely by the intelligent network on the basis of various criteria. These criteria may include time, the nature of subscribers A and B, location, etc. The call message may be transmitted to all the subscriber numbers stored in the database related to the called subscriber, or only to a part of them. This procedure in which a call is substantially simultaneously transmitted to several subscriber numbers will be termed below as "parallel paging".

In a second mode of operation, the intelligent network knows at which number of the plurality of numbers stored in the database the subscriber can be reached. Thus, a call is transmitted to this subscriber number only. This procedure in which the call is transmitted to one specific number only will be referred below to as "precision paging". In association with precision paging, the intelligent network must thus know the location of the called subscriber. It may be informed about it by the subscriber of the service, who has provided the network with the number to which he wishes the calls to be connected. Alternatively, it is also possible to make use of the fact that in case of PLMN networks, the databases of these networks have the information on whether the subscriber is registered to the network, or whether the mobile station has been switched off from the network. In case of the GSM network, the information is located in a home location register HLR. A PLMN network may inform the intelligent network automatically every time when the status of the mobile subscriber changes, or the intelligent network may make enquiries about it.

Precision paging is particularly advantageous when the subscriber has a multimode telephone, such as a combined GSM/DECT telephone. In an office environment or at home, the subscriber uses the DECT mode, and the GSM mode has been switched off. The GSM network has informed the intelligent network thereof, and all the calls are thus directed directly to the DECT number in accordance with the precision paging. When the subscriber leaves home or office, he switches the phone to the GSM mode, or the mode will be switched automatically. The intelligent network will be informed of this, and it will direct the incoming calls directly to the GSM phone. For this reason, the service in accordance with the invention may be termed as an Intelligent Multimode Service IMS.

In case the location of the called subscriber is not known by the intelligent network, it will transmit a call message in the parallel paging mode or inquire about the location of the subscriber from external databases, such as the home location register HLR of the GSM system.

The triggering criterion that forces the call to the intelligent network may be a certain prefix of the called number or a terminating IN category stored in the PLMN exchanges and e.g. an ICS (Intercept Service) category in the fixed networks. When the digit analysis shows that the called number belongs to these categories, the call will be routed to the intelligent network.

On account of the invention, transmitting unnecessary interrogations, signalling messages and call messages in the network will be avoided. A call may also be transmitted to one subscriber number only.

Figure 2:
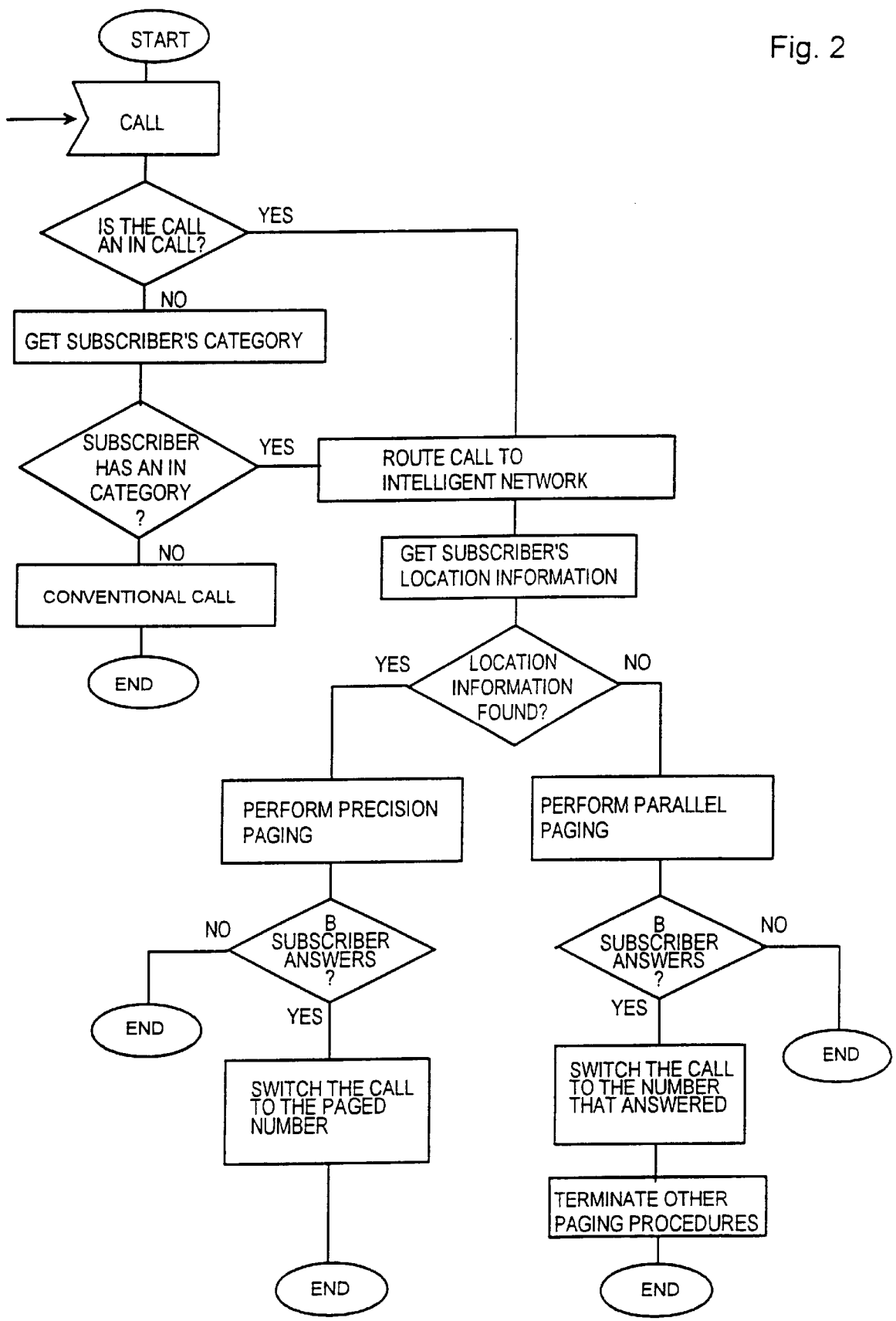
Figure 3:
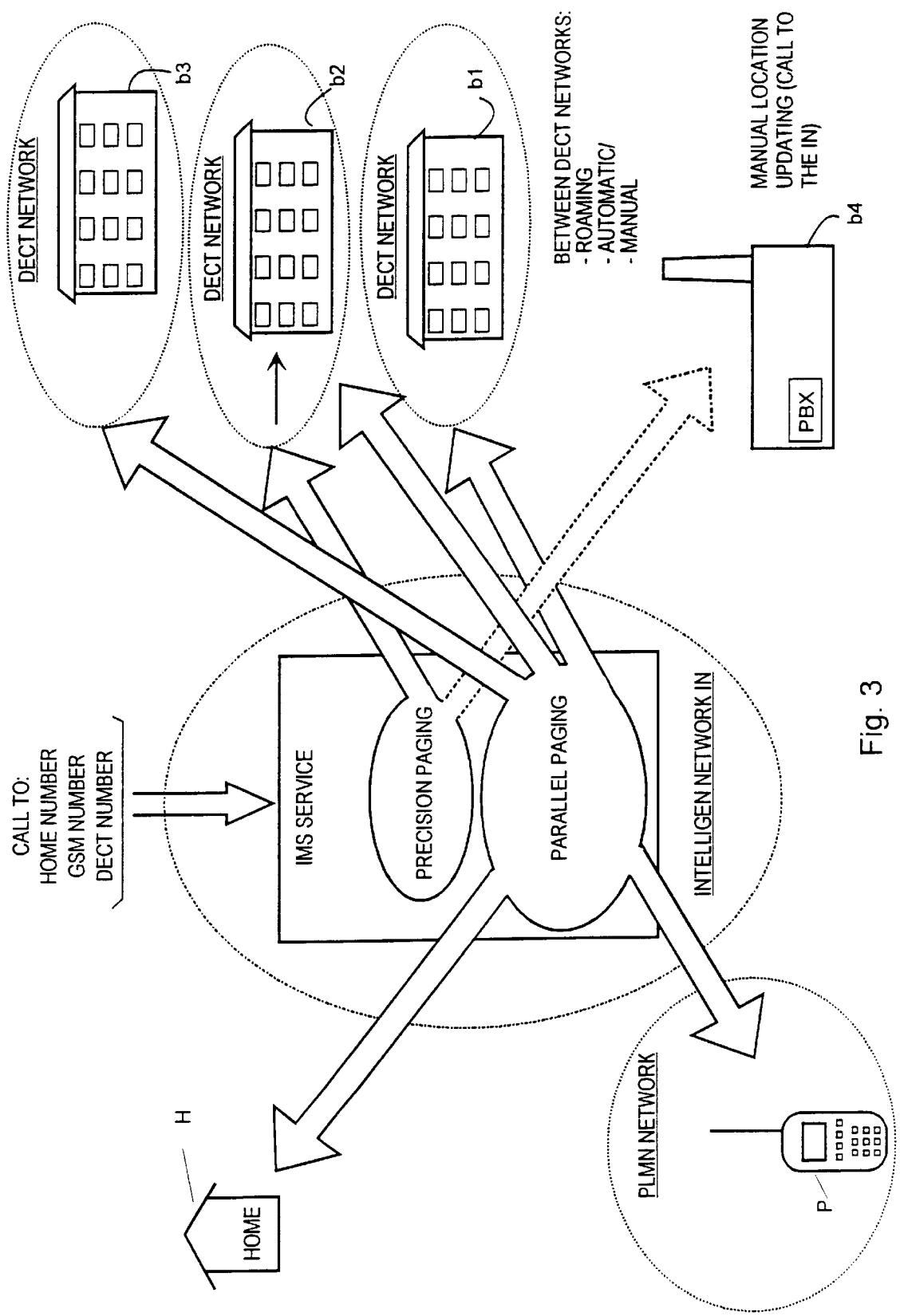

In the following, the invention will be disclosed in closer detail with reference to the attached figures, in which FIG. 1 shows a general view of the method of the invention, FIG. 2 shows a flow chart of the principle of the invention, and FIG. 3 shows various paging modes in case of a multimode telephone.

In FIG. 1, PSTN refers to the public switched telephone network, to which a plurality of cells in accordance with the DECT system may be connected. The cells may be cordless exchanges or cordless subscriber lines, to which a connection is established by means of a DECT telephone. The figure also shows the GSM network and the NMT network as examples of mobile networks. A service switching point SSP of the intelligent network is closely connected to at least some of the exchanges of the networks. The SSP identifies the IN calls, and the subscribers may use the services provided by the intelligent network via the SSP in a way known per se. The service programs are located in a service control point SCP, which utilizes the subscriber and network data stored in the databases of the service data point SDP. The SCP communicates with the SSP by means of an Intelligent Network Application Protocol INAP.

In the following, the invention will be disclosed by means of a general example, in which a calling subscriber A wishes to reach a subscriber B. Subscriber A is a subscriber of the fixed network, but he may equally well be a mobile subscriber. Let us assume that subscriber B is a GSM subscriber. In addition, he also has a DECT phone which he uses e.g. in his office. Different steps are marked in the figure with ringed numbers. A dotted line illustrates signalling connections, and a solid line represents a speech channel. Let us assume first that the intelligent network does not know at which telephone the called subscriber can be reached. The service program then uses the parallel paging mode.

The calling subscriber dials a number, and the triggering criteria included in the number will direct the call to the intelligent network. The triggering criterion may be a specific prefix or detecting the fact that the called number belongs to a specific subscriber IN category. Alternatively, it is possible to employ such an arrangement in which certain called numbers, such as all the numbers of a company E, form a terminating IN category, in which case the general called number is e.g. in the form 90299xxxx, and all the call requests containing a number that belongs to this group will be routed to the intelligent network. A transfer unit of the PSTN network, usually an exchange, will identify the call to be an IN call and direct the call to the service switching point SSP of the intelligent network (step 1). The SSP will analyze the number and thereafter transmit a service request and the called number to the service control point SCP (step 3).

The SCP will receive the number and activates the service program in accordance with the invention (step 4). The service program will make an inquiry to the database of the SDP (step 5), which database will retrieve from the subscriber data the information on which other destination numbers are associated with the called number, and provide the service program with a list of destination numbers, said list containing all the numbers registered by the subscriber of the service (step 6). The function may be similar to the one in the prior art Personal Number, whereby numbers C corresponding to the personal subscriber number will be retrieved from the database. The service program will select from the above-mentioned list a GSM number and a DECT number, and, provide the destination numbers in response to the service request made by the SSP earlier in connection with step 3. In this case, said destination numbers are a GSM number and a DECT number (step 7). There may be a desired number of the destination numbers, and advantageously the subscriber of the service may determine to which numbers the paging shall be directed. The subscriber may command the paging to be directed e.g. to the most economical subscriber number at the current moment.

In accordance with the invention, the response also contains an instruction to transmit a call initiating message simultaneously both to the mobile services switching centre MSC of the GSM network and to a specific exchange/base station of the DECT system. The SSP will first perform its own share of call initializing both to the GSM number and to the DECT number (step 8), whereafter the exchange to which the SSP is connected will perform the normal call initializing to the numbers in question (steps 9 and 10).

In the GSM network, the mobile services switching centre MSC knows the location of subscriber B with the accuracy of the location area, and the paging message will thus be transmitted via the base station controller BSC and the base stations under its control in the location area LA.

Simultaneously during initialization taking place in the GSM network, a call setup message in accordance with the signalling of the switching network, e.g. TUP or ISUP signalling will be transmitted to the DECT transceiver, which will forward the call along the radio path. At this stage, the signalling connection has been established both to the GSM network and to the DECT system, connections 9 and 10.

The called subscriber will answer his GSM mobile phone, and the MSC will report this, i.e. transmit an answer message in accordance with the signalling to the exchange associated with the SSP. The SSP will detect that the triggering criteria set in the basic call state model BCSM are fulfilled, and report to the SCP that the called subscriber has answered in the GSM network. The SCP will release the signalling connection in the direction of the DECT system and give a command to establish a speech connection between the calling subscriber and the called subscriber. The speech connection is marked in the figure with a thick solid line. Simultaneously, call billing and the other necessary functions related to the call will be activated in a manner known per se.

The invention is particularly useful if the telephone sets of two systems, such as a DECT phone and a GSM phone have been combined into one multimode telephone set. In such a case, the subscriber may use the DECT mode in the office environment and/or at home, in which case the calls are usually cheaper, but, when a high degree of mobility and handover capability are required, the subscriber will use the GSM mode. The DECT network that allows the subscriber to employ the DECT mode of his telephone may be a company PBX network that allows roaming and location updating. Roaming may be either manual, whereby the subscriber, upon entering another radio network, performs a location updating in the same way as in analog mobile networks in the case where the country code is changed, or it may be automatic as is the case in digital mobile networks. In such a case, the service program of the invention will use the second mode, the precision paging. The GSM network has the information on whether the subscriber is registered to the network, that is, whether the phone is switched on. This information is contained in the home location register HLR. This information may be automatically transferred to the service program, or the service program may inquire about it from the GSM network. It is also possible to provide the DECT network with a facility that stores in a database the subscribers that are currently registered to the network. The information will be transferred to the service program of the intelligent network. In case of a multimode phone, the intelligent network is thus aware of the location of the subscriber.

If the subscriber is communicating in the DECT network, FIG. 1, he will switch off the GSM mode in order to utilize lower tariffs. The database of the service program will thus be provided with the information that the GSM phone section is not in use, but the DECT section is in use. When the call of subscriber A reaches the service program 1, the program will be informed by the database in which DECT network the called subscriber can be reached. The paging message will thus be transmitted in the precision paging mode to this number only. In FIG. 1, signalling 10 is omitted.

Correspondingly, if the subscriber leaves the DECT network, he will register to the GSM network and switch off from the DECT network. Information on this event will be stored in the HLR of the GSM network, and the mobile services switching centre will inform the intelligent network. Correspondingly, the DECT network will inform the intelligent network on the fact that the subscriber is not available at his DECT number. When the call of subscriber A reaches the service program 1, the database will provide the program with the information that the called subscriber can be reached in the GSM network only, whereby the paging message will be transmitted in the precision paging mode to the GSM number only. In FIG. 1, signalling 9 is omitted.

FIG. 2 shows a flow chart of the functions described above. First of all, it is identified on the basis of the prefix of the called number or the subscriber category of the number whether a conventional call or an IN call is concerned. In the latter case, the call will be routed to the intelligent network, which will retrieve from the database the location information related to the called subscriber. The database may contain a group of terminal numbers that may be associated with some reach ability index. If one index shows that the subscriber can be reached at the number associated with the index, precision paging will be chosen as the mode of operation, and the call will be switched to said number. If none of the reach ability indexes shows that the subscriber can be reached at the number associated with the index, parallel paging will be chosen as the mode of operation, and a paging message will be transmitted to all the numbers determined for the subscriber.

It is also possible to retrieve the location information in such a way that the intelligent network will enquire from the PLMN networks and the DECT networks whether the subscriber is currently connected to the network in question. After obtaining the information, the service program of the intelligent network will perform a precision paging or a parallel paging.

FIG. 3 illustrates the invention in a special case where the subscriber of the service has a multimode telephone that is operable both in the GSM network and in the DECT network. There is an incoming call to the subscriber either to his home number, the GSM number, or the DECT number. The call will be routed to the IMS service of the intelligent network, which will perform a precision paging or a parallel paging.

For performing a precision paging, the intelligent network must know the location of the subscriber. The location may be reported e.g. in the following way: a local DECT network has been installed in each of the geographically remote office buildings b1, b2 and b3 of a company. When a subscriber is moving from a building to another, the DECT section of a multimode telephone is registered to the new network either manually by the user, or automatically. If the subscriber moves to the premises b4 of another company, he may perform location updating by calling to the IMS service of the intelligent network in accordance with the invention and give that number of the PBX network at which he can be reached. If the subscriber is at home, building h, he may perform a location updating to his home telephone by calling the intelligent network, or the location updating may be performed automatically by the telephone. If the subscriber is moving outside the locations mentioned above, he will switch on the GSM mode of his multimode telephone, whereby the location of the telephone will be updated to the home location register HLR of the GSM network. Let us assume that the subscriber is registered to the DECT network of building b2. The IMS service may thus employ precision paging and transmit a paging message only to building b2 connected to the DECT network. This is marked with an arrow starting from the precision paging block. If the location information indicated that the subscriber is in the building b4, the precision paging would transmit a paging message only to the exchange of this building. This is represented by an arrow marked with a dotted line.

If the IMS service does not know the location of the subscriber of the service, it will transmit a paging message to all the numbers retrieved by the service program from its database, in this case to the home number, the GSM number and the DECT number. A speech connection will be established to the subscriber station that first answers the call, and the other connections will be released. The paging messages transmitted in the parallel paging are marked with arrows starting from the parallel paging block.

The above explanation and the figures associated therewith are only intended to illustrate the present invention. Different variations and modifications of the invention will be obvious to persons skilled in the art without deviating from the scope and the spirit of the invention set forth in the attached claims. Call billing may be carried out either by the intelligent network and/or by the network of the calling subscriber. Call routing is handled by the service switching function SSF of the IN by means of other IN functions. Subscriber management of the service is ideally carried out in form of one electric sheet in which the required subscriber definitions are carried out in a concentrated manner. It is also possible to transmit different voice messages to the calling subscriber for reporting an anomalous call and providing information on call tariffs.

What is claimed is:

1. A method of establishing a speech connection between a calling subscriber and such a called subscriber for which a plurality of terminal numbers have been determined, wherein a call is routed to an intelligent network if a triggering criteria for the routing is fulfilled, characterized by:

routing the call further to a service program of the intelligent network, said service program having a first mode of operation and a second mode of operation, selecting by the intelligent network that mode of operation of said service program which is to be used for transmitting a paging message of the call, wherein in case the first mode of operation is selected, a parallel paging message is transmitted to several terminal numbers substantially simultaneously and a speech connection is established between the terminal station of the calling subscriber and that terminal station of the called subscriber that first answers the call, or alternatively in case the second mode of operation is selected, a precision paging message is transmitted to one predetermined number only and a speech connection is established to the terminal station associated with this number, once the terminal station has answered the call.

2. A method as claimed in claim 1, characterized by the service program finding out which terminal number has possibly been predefined by the called subscriber as the primary number.

3. A method as claimed in claim 2 characterized in that none of the numbers is a primary number, whereby the service program will shift to said first mode of operation.

4. A method as claimed in claim 2, characterized in that in case one number is a primary number, the service program will define said number as predetermined number and shift to said second mode of operation.

5. A method as claimed in claim 2, characterized in that at least one of the numbers is a number related to a PLMN network and that upon the subscriber performing a location updating to this network, this number automatically becomes the primary number.

6. A method as claimed in claim 2, characterized in that at least one of the numbers is a number related to a PLMN network and at least one is a number related to the DECT system, and that one of these numbers is a primary number.

7. A method as claimed in claim 6, characterized in that the terminal station in a multimode terminal station that is operable both in the GSM system and in the DECT system and that only one of the numbers may be a primary number.

8. A method as claimed in claim 1, characterized by transmitting the paging message to each number determined for the subscriber.

9. A method as claimed in claim 1, characterized in that the triggering criterion is a prefix contained in the called number.

10. A method as claimed in claim 1, characterized in that the triggering criterion is the subscriber category of the called number.

11. A method for establishing a speech connection between a calling subscriber and such a called subscriber for which a plurality of terminal numbers have been determined in a network comprising a plurality of fixed and cordless exchanges or cordless subscriber lines and mobile networks, at least some of the networks being connected to one or more service switching points of intelligent networks IN, to which service switching points predetermined calls can be routed from the networks, the switching points having an access to utilize subscriber and network data stored in databases, the method comprising the following steps:

routing an incoming call to the intelligent network in accordance with a predetermined triggering criterion, checking the location of the called subscriber in the networks, routing the call further to a service program of the intelligent network, said service program having a first mode of operation and a second mode of operation, selecting by the intelligent network that mode of operation of said service program which is to be used for transmitting a paging message of the call, wherein the selection is accomplished on basis of the information obtained in the checking and the call is routed to one or more numbers of the called subscriber meeting the predetermined criteria, and in case the first mode of operation is selected, a parallel paging message is transmitted to several terminal numbers substantially simultaneously and a speech connection is established between the terminal station of the calling subscriber and that terminal station of the called subscriber that first answers the call, or alternatively in case the second mode of operation is selected, a precision paging message is transmitted to one predetermined number only and a speech connection is established to the terminal station associated with this number, one the terminal station has answered the call.

12. A method as claimed in claim 11, characterized by the steps of:

identifying an intelligent network call in a transfer unit, usually an exchange, of the PSTN network, routing the call to a service switching point SSP of the intelligent network, analyzing the number and transmitting thereafter a service request and the called number to a service control point SCP of the intelligent network, receiving the number in the SCP and starting a check by making an inquiry to the database that contains the information on the location, retrieving from the subscriber data the information on which destination numbers are associated with the number, transmitting to the service program a list of destination numbers, the list containing all the numbers registered by the subscriber of the service, choosing from said list the destination number/numbers in response to the service request made by the SSP, transmitting a call initiating message to the chosen number/numbers, and the other standard call initializing messages to the number/numbers meeting the predetermined criteria, establishing a corresponding signalling connection, releasing, under control of the SCP, the remaining signalling connections once a speech connection has been established to one number that meets the predetermined criteria.

13. A method as claimed in claim 12, characterized by carrying out location updating in the same way as in the mobile networks.

14. A method as claimed in claim 13, characterized by transmitting to the location database of the service program of the intelligent network from a mobile network and/or a cordless and/or a fixed network the information on whether the subscriber is registered to the network.

15. A method as claimed in claim 14, characterized by communicating to the location database of the service program of the intelligent network the information on the area of which base station and/or exchange/PBX the called subscriber is located.

* * * * *